United States Patent [19]

Roe

[11] Patent Number: 5,256,444
[45] Date of Patent: * Oct. 26, 1993

[54] METHOD FOR SUPPRESSING DUST EMISSIONS FROM BULK SOLIDS

[75] Inventor: Donald C. Roe, Tabernacle, N.J.

[73] Assignee: Betz Laboratories, Inc., Trevose, Pa.

[*] Notice: The portion of the term of this patent subsequent to Jul. 7, 2009 has been disclaimed.

[21] Appl. No.: 816,199

[22] Filed: Jan. 2, 1992

Related U.S. Application Data

[63] Continuation-in-part of Ser. No. 574,636, Aug. 29, 1990, Pat. No. 5,128,178.

[51] Int. Cl.$^5$ .................................. B05C 1/16
[52] U.S. Cl. .................... 427/136; 427/212; 427/221; 427/244; 252/88
[58] Field of Search .............. 427/212, 221, 136, 244; 252/88, DIG. 2, 174.22; 44/602

[56] References Cited

U.S. PATENT DOCUMENTS

| | | | |
|---|---|---|---|
| 3,954,662 | 5/1976 | Salyer | 252/382 |
| 4,087,572 | 5/1978 | Nimerick | 427/214 |
| 4,380,459 | 4/1983 | Netting | 55/87 |
| 4,400,220 | 8/1983 | Cole | 134/18 |
| 4,417,992 | 11/1983 | Bhattacharyya et al. | 252/88 |
| 4,426,409 | 1/1984 | Roe | 427/221 |
| 4,551,261 | 11/1985 | Salihar | 252/88 |
| 4,594,268 | 6/1986 | Kirwin | 427/136 |
| 4,650,598 | 3/1987 | Roberts et al. | 252/88 |
| 4,746,543 | 5/1988 | Zinkan et al. | 427/136 |
| 4,780,143 | 10/1988 | Roe | 106/102 |
| 4,780,233 | 10/1988 | Roe | 252/88 |
| 4,801,635 | 1/1989 | Zinkan | 524/156 |

OTHER PUBLICATIONS

Encyclopedia of Polymer Science and Engineering, vol. 11, 2d ed., 1988, pp. 489–507.

Primary Examiner—Terry J. Owens
Assistant Examiner—Benjamin L. Utech
Attorney, Agent, or Firm—Alexander D. Ricci; Steven D. Boyd

[57] ABSTRACT

Methods and compositions for controlling fugitive dust emissions from bulk granular or powdered solids are disclosed. Fugitive dust emissions are controlled by applying an aqueous, foamed solution including a water-soluble cationic polymer to dust producing bulk, granular or powdered solids. The cationic polymer is incorporated into an aqueous foam comprising anionic, amphoteric or cationic foaming agents.

4 Claims, No Drawings

METHOD FOR SUPPRESSING DUST EMISSIONS FROM BULK SOLIDS

This application is a continuation-in-part of application Ser. No. 07/574,636 filed Aug, 29, 1990, now U.S. Pat. No. 5,128,178.

FIELD OF THE INVENTION

The present invention relates to methods of suppressing fugitive dust emissions by applying an aqueous foamed solution including a water-soluble cationic polymer to dust producing bulk solids. More particularly, the present invention relates to methods for providing residual or long term fugitive dust control for bulk granular or powdered solids with an aqueous foamed solution including a water-soluble cationic polymer. The aqueous solution may be foamed by incorporation therein of an anionic, amphoteric or cationic foaming agent.

BACKGROUND OF THE INVENTION

Dust dissemination poses safety, health, and environmental problems in many commercial environments. For instance, in many industries, the transportation handling and storage of bulk solids is common as in industries such as mining, mineral processing, agricultural, power, steel, paper, etc. One major problem associated with bulk solids is dust generation and the control of fugitive dust emissions.

Industrial sources of fugitive dust include open operations, leaks and spills, storage, disposal, transit or poor housekeeping of sundry finely divided solid particulates. The iron and steel industries are replete with examples of the above enumerated categories. Wind erosion of exposed masses of particulate matter such as coal or mine mill tailings, fertilizer, etc., causes both air pollution and economic waste. Detrimental effects on health and cleanliness result where these fine particles are carried aloft by the winds.

A typical method for controlling the dust is to apply a water spray. However, water sprays only control dust for a short period of time depending upon environmental conditions. The application of the spray has to be repeated frequently to provide ongoing dust control. U.S. Pat. No. 3,954,662 discloses aqueous foamable compositions and their use to suppress coal dust. The composition contains water, an interpolymer of a polymerizable vinyl ester and a partial ester compound interpolymerizable with the vinyl ester, and a detergent wetting agent. The interpolymer binds coal dust and keeps the dust particles encapsulated after the foam has collapsed.

U.S. Pat. No. 4,087,572 discloses a combination of an organic polymer latex such as a styrene-butadiene interpolymer and a silicone applied to the surface of a coal pile or other mass of finely divided particulate materials. In addition, a wetting agent may be incorporated to prevent premature coagulation. The combination is applied as an aqueous mixture such as by spraying.

U.S. Pat. No. 4,551,261 discloses the suppression of dust with an aqueous foam comprising a foaming agent and an elastomeric water insoluble polymer. The foam provides immediate dust suppression and eases application. The polymer coats the material and continues to suppress dust generation during handling of the material after the foam has collapsed.

U.S. Pat. No. 4,594,268 discloses the use of at least one methacrylate polymer for dust suppression. The methacrylate polymer provides dust suppression when applied to a wide variety of materials. After application, the polymer provides a tacky, water resistant coating which effectively prevents dusting while additionally acting as an anti-freeze agent.

U.S. Pat. No. 4,801,635 discloses a combination of water soluble anionic acrylic polymers and nonionic glycol polymers and anionic and nonionic surfactants useful for the control of dust emissions into the environment.

U.S. Pat. No. 4,780,233 discloses a method and composition for controlling fugitive dust particles which comprises an oil containing dust control treatment including a small amount of a water insoluble elastomeric polymer. The inclusion of a small amount of elastomer significantly improves the dust control performance. The composition can be applied as a spray or foam.

DESCRIPTION OF THE PREFERRED EMBODIMENT

The present invention relates to improved methods and compositions for controlling fugitive dust emissions from bulk, granular or powdered solids. Fugitive dust emissions are controlled by applying an aqueous, foamed solution including a water-soluble cationic polymer to dust producing bulk, granular or powdered solids. The cationic polymer is incorporated into an aqueous foam comprising anionic, amphoteric or cationic foaming agents. Wetting agents such as nonionic ethoxylated alcohols may also be included for improved wetting of the solid substrate. For materials with a propensity for caking or similar handling problems, anticaking agents or flow aids may be included such as cationic amines, tallow primary amines, mineral oils, etc.

The dust control methods and compositions of the present invention are particularly effective at controlling fugitive dust dissemination in the processing and handling of flyash, coal phosphate and urea. In the treatment of urea and phosphate for dust control in accordance with the present invention anti-caking agents or flow aids are particularly desirable due to the tendency of these materials to cake. The compositions and methods of the present invention provide effective residual or long term dust control.

The dust control composition of the present invention is an aqueous solution of a water soluble cationic polymer. These materials may be selected from a wide variety of water-soluble cationic polymers. The polymers may be either addition polymers or condensation polymers. Most synthetic cationic polyelectrolytes are polyamine and polyquaternary ammonium salts although non-nitrogen based cationic species are known. Polyamines and polyquaternary amines can be prepared by free-radical chain polymerization, epoxide-addition reactions, condensation polymerization, and reactions on polymer backbones. Polymers of this type are described in Roe, U.S. Pat. No. 4,426,409, the disclosure of which is incorporated herein by reference. Polyamines and polyquaternary anions are also discussed at pp 489–507 of The Encyclopedia of Polymer Science and Engineering, Vol. 11, Second Edition, 1988.

The treatment solution is preferably supplied as a concentrate which is diluted prior to application as a foam. The treatment concentration, in percent cationic polymer by weight in the foam, can range from about 0.05 to 20.0% and is preferably from about 0.1 to 10.0%. The feed rate of foam onto the substrate, on a weight % basis, can range from about 0.05 to 30.0% and is preferably from about 0.1 to 15.0%.

The dust control composition of the present invention is applied as a foam. The foam for the dust control treatment may be foamed and applied via conventional techniques such as those disclosed in U.S. Pat. No. 4,400,220 (Cole), the contents of which are hereby incorporated by reference. Accordingly, a suitable foaming agent is included.

Cationic and amphoteric foaming agents are preferred. Amphoteric foaming agents such as coco amido sulfobetaines are especially preferred. Such foaming agents are available commercially. For example, EMCOL 6825 available from Witco Chemical Corporation. In general, cationic polymers cannot be foamed with anionic foaming agents due to the incompatability of the cationic and anionic species in solution. However, the inventor of the present invention discovered that certain cationic polymers e.g. diethylenetriamine adipic acid/epichlorohydrin can be foamed with an anionic foaming agents e.g. a blend of the sodium salts of C14-C16 alpha olefin sulfonate and alkyl ether sulfate. Exemplary commercial products are Bioterge AS-40 and Steol KS-460 available from Stepan Chemical Co. It is believed, therefore, that other anionic foaming agents may also be capable of foaming this and other cationic polymers.

The present invention will now be described with respect to a number of specific example which are to be regarded solely as illustrative and not as restricting the scope of the invention.

EXAMPLES

Laboratory testing was conducted to determine the dust control effects of water-soluble cationic polymer compositions on dust producing materials. The polymers were applied to the dust producing materials as aqueous foams with amphoteric and anionic foaming agents. The effectiveness was tested by measuring the relative dusting index (RDI) and percent dust suppression (% DS). The RDI of treated and untreated control samples was measured in a laboratory dust chamber equipped with an opacity monitor. The opacity monitor generated an opacity curve as a function of time, measured after introduction of the treated samples into the dust chamber. The relative dustiness index was measured as the area under the opacity curve. The percent Dust Suppression was a calculation based on the Relative Dustiness Index for untreated versus treated materials.

Table I summarizes the results of testing on urea showing the large decrease in RDI and relatively high % DS numbers for a variety of water-soluble cationic polymer treatments in accordance with the present invention. All samples were aged for 24 hours at 20° C. and 50% relative humidity prior to testing.

TABLE I

Effects of Foamed Cationic Polymers on Relative Dustiness (RDI) of Feed Grade Urea

| Treatment | Concentration (% Polymer in Foam) | Feed Rate (Wt % of Foam) | RDI | % DS |
|---|---|---|---|---|
| Control | — | — | 11.1 | — |
| Control | — | — | 12.2 | — |
| A | 0.25 | 0.22 | 2.3 | 80.3 |
| B | 0.25 | 0.23 | 2.5 | 78.6 |
| C | 0.25 | 0.22 | 2.8 | 76.1 |
| D | 0.25 | 0.23 | 4.1 | 65.0 |

Table II summarizes the results of testing on flyash showing the large decrease in RDI and relatively high % DS numbers for a variety of water-soluble cationic polymer treatments in accordance with the present invention. All samples were aged for 48-96 hours at 25° C. and 50% relative humidity prior to testing.

TABLE II

Effects of Foamed Cationic Polymers on Relative Dustiness (RDI) of Flyash

| Treatment | Concentration (% Polymer in Foam) | Feed Rate (Wt % of Foam) | Avg. RDI | Avg. % DS |
|---|---|---|---|---|
| Control | — | — | 18.5 | — |
| A | 5.0 | 15.0 | 1.0 | 94.6 |
| B | 5.0 | 15.0 | 1.7 | 90.8 |
| C | 5.0 | 15.0 | 1.9 | 89.7 |
| D | 5.0 | 15.0 | 2.3 | 87.6 |

Table III summarizes the results of testing on Eastern coal showing the decrease in RDI and relatively high % DS numbers for a variety of water-soluble cationic polymer treatments in accordance with the present invention. The results for treatment A in Table III are believed to be an anomaly whose cause is unknown. All samples were aged for 48-96 hours at 25° C. and 50% relative humidity prior to testing.

TABLE III

Effects of Foamed Cationic Polymers on Relative Dustiness (RDI) of Eastern Coal

| Treatment | Concentration (% Polymer in Foam) | Feed Rate (Wt % of Foam) | Avg RDI | Avg. % DS |
|---|---|---|---|---|
| Control | — | — | 8.7 | — |
| A | 10.0 | 3.0 | 8.8 | 0.0 |
| B | 10.0 | 3.0 | 1.8 | 79.3 |
| C | 10.0 | 3.0 | 2.6 | 70.1 |
| D | 10.0 | 3.0 | 2.3 | 73.6 |

Table IV summarizes the results of testing on Western coal showing the large decrease in RDI and relatively high % DS numbers for a variety of water-soluble cationic polymer treatments in accordance with the present invention. All samples were aged for 48-96 hours at 25° C. and 50% relative humidity prior to testing.

TABLE IV

Effects of Foamed Cationic Polymers on Relative Dustiness (RDI) of Western Coal

| Treatment | Concentration (% Polymer in Foam) | Feed Rate (Wt % of Foam) | Avg. RDI | Avg. % DS |
|---|---|---|---|---|
| Control | — | — | 13.2 | — |
| A | 10.0 | 7.5 | 6.4 | 51.5 |
| B | 10.0 | 7.5 | 1.7 | 87.1 |
| C | 10.0 | 7.5 | 1.2 | 90.9 |
| D | 10.0 | 7.5 | 1.3 | 90.2 |

Table V summarizes the results of testing on Granular Triple Super Phosphate (GTSP) showing the large decrease in RDI and relatively high % DS number for a variety of water-soluble cationic polymer treatments in accordance with the present invention. All samples were aged for 48-96 at 25° C. and 50% relative humidity prior to testing.

TABLE V

Effects of Foamed Cationic Polymers on Relative Dustiness (RDI) of (GTSP)

| Treatment | Concentration (% Polymer in Foam) | Feed Rate (Wt % of Foam) | Avg. RDI | Avg. % DS |
| --- | --- | --- | --- | --- |
| Control | — | — | 34.7 | — |
| A | 5.0 | 2.5 | 4.4 | 87.3 |
| B | 5.0 | 2.5 | 4.9 | 85.9 |
| C | 5.0 | 2.5 | 5.0 | 85.6 |
| D | 5.0 | 2.5 | 3.2 | 90.8 |

Legend:
A: Melamine/formaldehyde polymer and coco amido sulfobetaine amphoteric foaming agent.
B: diallyldimethyl ammonium chloride polymer and coco amido sulfobetaine amphoteric foaming agent.
C: diethylenetriamine/adipic acid/epichlorohydrin polymer and coca amido sulfobetaine amphoteric foaming agent.
D: diethylenetriamine/adipic acid/epichlorohydrin polymer and an anionic foaming agent.

As shown, foamed cationic polymers provide effective dust suppression on a variety of dust producing materials covering a wide range of physical and chemical properties. The dust suppressing effects appear to be independent of the type of foaming agent utilized to produce an aqueous foam, e.g. anionic versus amphoteric.

While the present invention has been described with respect to particular examples, it is apparent that numerous other forms and modifications of the invention will be obvious to those skilled in the art. The appended claims and this invention should be construed to cover all such obvious forms and modifications which are within the spirit and scope of the present invention.

What is claimed is:

1. A method of suppressing fugitive dust dissemination from a dust producing material comprising contacting said dust producing material with a dust suppressing amount of an aqueous foam solution containing a foam generating agent comprising an anionic foaming agent comprising the sodium salts of alkyl ether sulfate and C-14 to C-16 alpha olefin sulfonate and a water-soluble cationic polymer comprising diethylaminetriamine/adipic acid/epichlorohydrin polymer.

2. The method of claim 1 wherein said dust producing material is urea coal, flyash, or phosphate.

3. The method of claim 1 wherein said foam solution further includes a wetting agent.

4. The method of claim 1 wherein said foam solution further includes an anticaking agent.

* * * * *